United States Patent [19]
Zschimmer

[11] 3,818,207

[45] June 18, 1974

[54] APPARATUS FOR CONVERTING A MEASURING VOLTAGE INTO VALUES NOT PROPORTIONAL THERETO

[76] Inventor: Gero Zschimmer, P.O. Box 360, 1 Berlin 41, Germany

[22] Filed: Aug. 28, 1972

[21] Appl. No.: 284,052

[30] Foreign Application Priority Data
Mar. 21, 1972 Germany............................ 2214430

[52] U.S. Cl................. 235/197, 235/196, 324/71 R
[51] Int. Cl. ............................................. G06q 7/26
[58] Field of Search ........ 235/197, 184, 193, 151.3, 235/196; 324/58.5, 64, 65, 71

[56] References Cited
UNITED STATES PATENTS

| | | | |
|---|---|---|---|
| 2,905,385 | 9/1959 | Larse .................................. | 235/196 |
| 2,915,898 | 12/1959 | Van Luik, Jr................... | 235/196 X |
| 3,422,258 | 1/1969 | Charter et al...................... | 235/196 |

Primary Examiner—Joseph F. Ruggiero
Attorney, Agent, or Firm—Smythe & Moore

[57] ABSTRACT

The invention relates to an apparatus for converting a measuring voltage into a second voltage which is not proportional to the measuring voltage. The apparatus comprises a first linear circuit element at the measuring voltage source and a network of additional linear circuit elements connected thereto. The network may be connected to earth. A quotient measuring means has a numerator input and a denominator input and also has a zero input variable with respect to a fixed reference point and which serves as a variable reference point for the numerator and denominator input voltages. The linear circuit elements may be resistors. One or more diodes may be incorporated into the network. If the measuring voltage is alternating, then an inductor or capacitor may be included in the network.

10 Claims, 4 Drawing Figures

APPARATUS FOR CONVERTING A MEASURING VOLTAGE INTO VALUES NOT PROPORTIONAL THERETO

This invention relates to an apparatus for converting a measuring voltage into a second voltage which is not proportional to the measuring voltage. The invention has particular reference to the case where a change in the measuring voltage is generated in non-linear dependence upon a non-electrical phenomenon, for example temperature, and where it is desired to convert this measuring voltage into a second voltage which is directly proportional to the non-electrical phenomenon which is to be measured. Apparatus of this kind is employed particularly in digitial technology where a high accuracy is of great importance.

It is known to provide an amplifying circuit which is capable of performing such a conversion, which amplifying circuit has a characteristic of inverse sense to the dependence of the measuring voltage upon the phenomenon which is being measured. The construction of such amplifying circuits, however, presents difficulties.

It is an object of this invention to perform the conversion of a measuring voltage into a second voltage not proportional to the measuring voltage in a simpler and reproducible manner.

The present invention, therefore, provides an apparatus for converting a measuring voltage into a second voltage which is not proportional to the measuring voltage, comprising a first linear circuit element across which there is a drop in said measuring voltage, a network of linear circuit elements connected to said first linear circuit element and to a fixed reference point, a quotient measuring means having a numerator input and a denominator input and also having a zero input variable with respect to said fixed reference point and serving as a variable reference point for the counter and denominator input voltages, so that from the measuring voltage, two auxiliary voltages are formed of which the one is between the counter input and the zero input and the other is between the denominator input and the zero input.

The fixed reference point may be earth. The invention consists therefore in that the potential at the denominator input and/or at the zero input is not kept constant but allowed to change in dependence upon the measuring voltage. This can be performed with the aid of a network of linear circuit elements in a relatively simple manner which is above all reproducible.

In preferred embodiments of the invention the said linear circuit elements comprise resistors.

A circuit forming a preferred embodiment of the invention provides a first resistor across which there is a drop in the measuring voltage, and said network comprises second and third resistors in series with said first resistor, fourth and fifth resistors together in series and in parallel with said first and second resistors, sixth and the combination seventh resistors together in series and the combination in parallel with said first, second and third resistors and wherein the said numerator input, the said zero input and the said denominator input of the said quotient measuring means are respectively connected to the network between said forth and fifth resistors, between said first and second resistors, and between said sixth and seventh resistors, and wherein said first resistor has a resistance of finite value greater than zero. The second to seventh resistors may have any value including zero and infinity, and the values of these second to seventh resistors may be chosen in such a manner as to give a desired relationship between the various input voltages to the quotient measuring means. With such a network the most widely differing characteristics of the measuring voltage source can be linearised by a suitable choice of the resistors.

Further embodiments of the invention provide that a non-linear circuit element for example one or more diodes may be connected into the network. For example, a diode may be provided when it is required to level out a characteristic which departs particularly strongly from linearity. For instance, a diode may replace, be put in parallel with or in series with any of the 2nd through 7th resistors, depending on the characteristic desired.

A preferred embodiment of the invention for use where the measuring voltage source is remote from the network, such that the resistance of leads therebetween assumes significant proportions, provides that that lead resistance through which current flows when a measurement is being made has, in parallel, a resistor of high resistance compared with that lead resistance, which resistor of high resistance forms part of the network, and is arranged to be selectively connected to said fixed reference point.

A switch may be provided operative to isolate each of the three inputs of the quotient measuring means, each such switch being coupled with a further switch actuable in parallel with its associated input switch, and each further switch having one pole connected to said fixed reference point.

The resistor of high resistance is preferably constituted as two resistors in series connected to said fixed reference point via a said further switch connected between the two resistors of high resistance.

The two resistors constituting said resistor of high resistance are preferably proportional to two resistors of the network between which the denominator input of the quotient measuring means is connected to the network.

Figure 1:
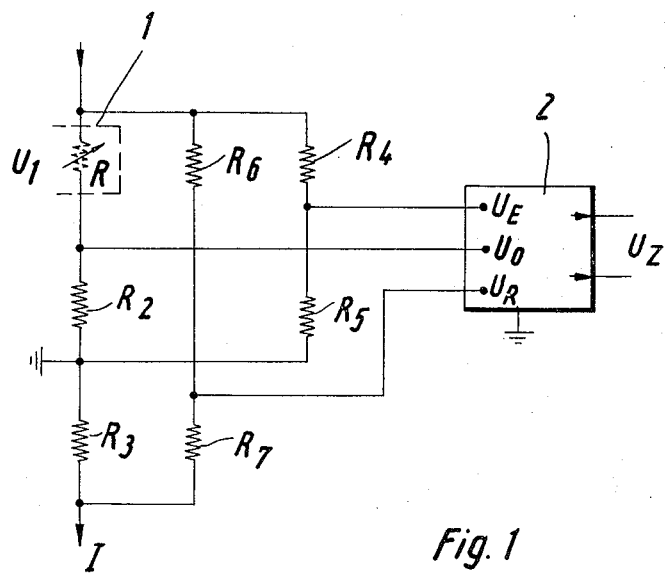
FIG. 1 shows one embodiment of the present invention.

Referring now to FIG. 1, a measuring voltage source constituted as a pick-up 1, which includes a resistor R, delivers a measuring voltage which varies in some way in dependence upon the non-electrical quantity to be measured. Resistors $R_2$-$R_7$ are connected together into a network such that R, $R_2$, and $R_3$ are in series, $R_4$ and $R_5$ are together in series, the combination in parallel with resistors R and $R_2$, and $R_6$ and $R_7$ are in series, in parallel with the series R to $R_3$. The network is connected to earth between resistors $R_2$ and $R_3$. An additional voltage source is connected between the junction of resistors R, $R_6$ and $R_4$ and the junction of resistors R3 and R7 so that a current will flow through the voltage divider. A quotient measuring device 2 has inputs $V_E$, a counter input; $U_0$, a zero input; and $U_R$, a denominator input, respectively connected to the network between resistors $R_4$ and $R_5$, between resistors R and $R_2$, and between resistors $R_6$ and $R_7$. Such quotient measuring devices are well known in the art. For example, the device may take the logarithm of the numerator and the denominator signals, subtract the denominator from the numerator and convert the difference signal back.

Across R there is a measuring voltage drop $U_1$. Between inputs $U_E$ and $U_O$ of the quotient measuring means a voltage is therefore connected which comprises component $U_1'$ derived from $U_1$ and an additive component $\pm a$, from the additional voltage source, which is dependent on the network. Likewise between inputs $U_R$ and $U_O$ of the quotient measuring means a voltage is connected which is compounded of a magnitude $U_1''$ derived from $U_1$ and an additive magnitude $\pm b$ from the additional voltage sourece, which likewise are both dependent on the network. $U_1$ and $U_1' \pm a$ on the one hand and $U_1'' \pm b$ on the other hand are proportional at any given time. In the quotient measuring means, the quotient $U_2 = U_1' \pm a/U_1'' \pm b$ is formed. $U_2$, the output magnitude from the quotient measuring means 2, can have within wide limits any dependence upon $U_1$ whereby the function $U_2 = f(U_1)$ is dependent upon the network that is required for any given application. Thus one is in a position to produce the dependence required, by choosing a particular network. In particular, the circuit according to FIG. 1 allows the voltages to be fed to the quotient measuring means to be generated with the correct sign. This is sometimes necessary since certain measuring means cannot operate with either polarity. Thus, for example, if $R_4$ is zero, then $U_E > U_0$, and by suitable choice of the resistances of the other resistors, in particular $R_6$, it can be arranged that $U_E > U_0 > U_R$. Conversely, if $R_5$ is zero, and provided that $R_2$ is not zero, then $U_O > U_E$, and again by suitable choice of the other resistors, it can be arranged that $U_0 > U_R > U_E$.

Figure 2:
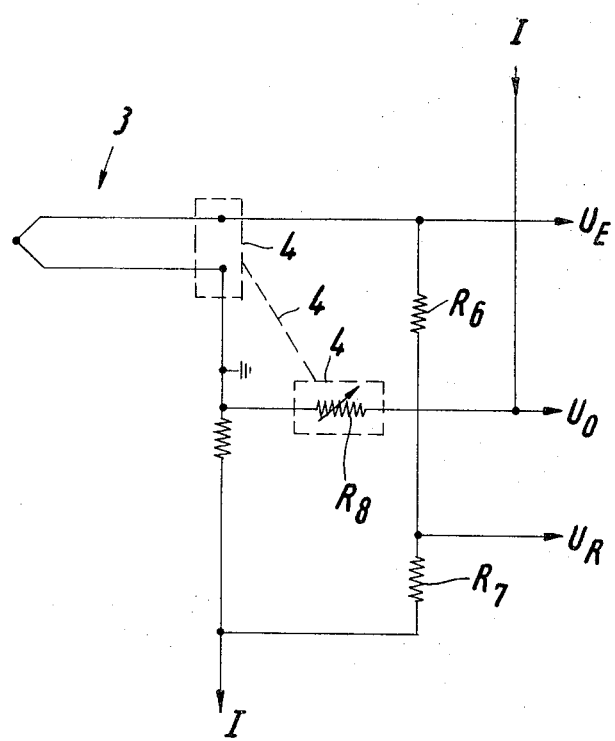
FIG. 2 shows an embodiment of the voltage division circuit.

In FIG. 2 a circuit is shown in which the measuring voltage is generated by a thermocouple 3. A resistor $R_8$ whose resistance is temperature-dependent is provided so that the zero point can be shifted. (The dotted line 4 signifies that the resistor $R_8$ and the point of connection of the thermocouple are accommodated in one housing). In this way the temperature of the space in which the measurement is being made can be taken into consideration. Instead of the resistor $R_8$, a voltage source, e.g., another thermocouple, can be provided. Naturally this circuit, can also include another voltage-divider $R_4$, $R_5$ (see FIG. 1). Instead of the thermocouple 3 a different voltage source can be provided.

Figure 3:
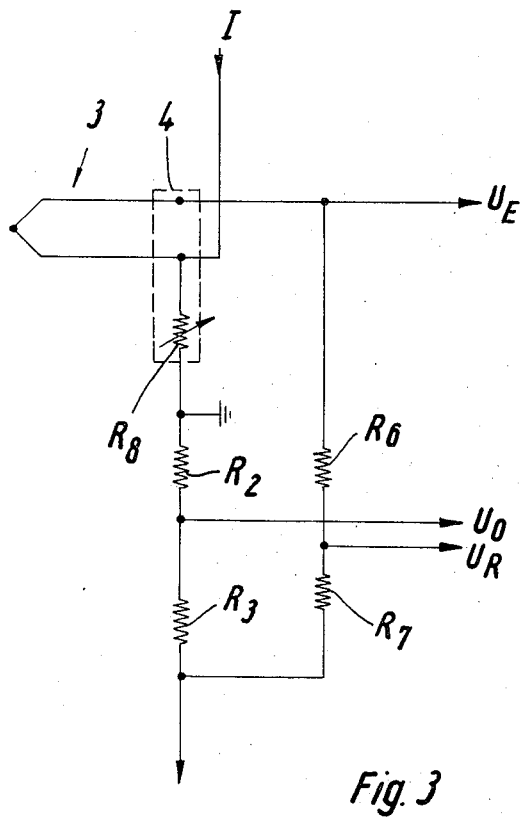
FIG. 3 shows another embodiment of the voltage division circuit.

With reference to FIG. 3, the additional voltage is applied directly to one terminal of a thermocouple 3, rather than to the reference voltage point $U_0$. Thus, the reference voltage is not at the same value as the additional voltage. Additionally, the voltage division network is modified such that a characteristic different from that of FIG. 2 is achieved for the thermocouple.

Figure 4:
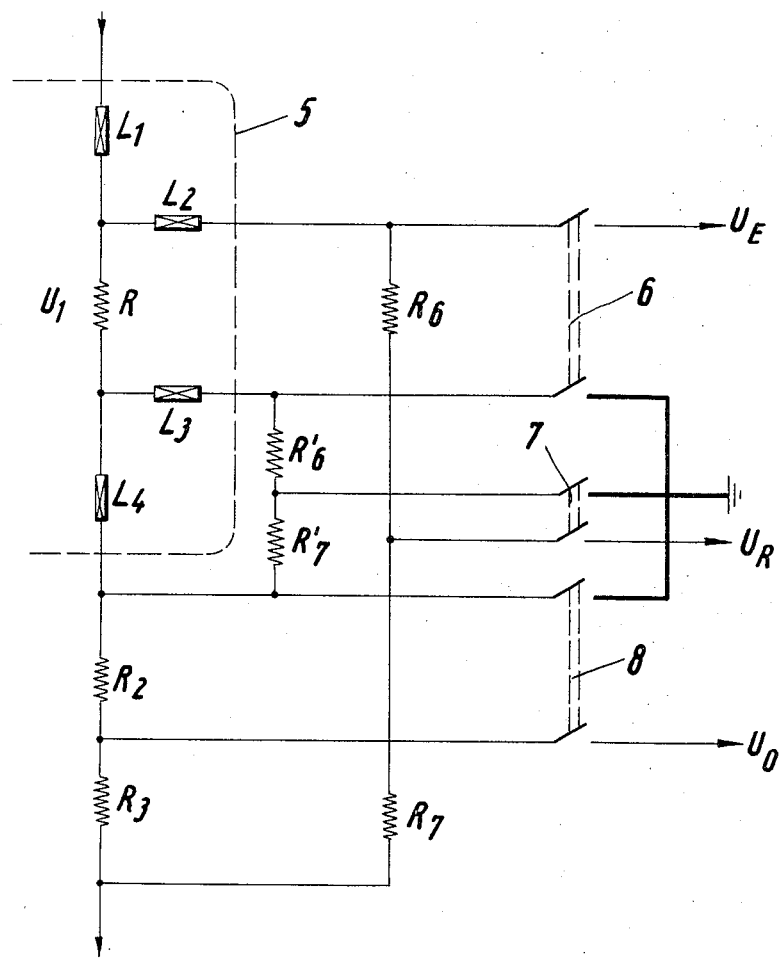
FIG. 4 shows yet another embodiment of the voltage division circuit with a switching circuit included.

FIG. 4 shows a circuit for a device in which the distance between the measuring voltage source and the remaining portion of the device i.e., the network is great. The dotted line 5 is to show that all the parts lying to the left of this line are remote from the network. R is a remotely situated resistor which responds, for example, to temperature. $L_1 - L_4$ are the resistances of the leads. The resistors $R_2$, $R_3$, $R_6$, $R_7$, $R_6'$, $R_7'$ are as shown connected together into a network. The arrows $U_E$, $U_R$ and $U_0$ point to the inputs of a quotient measuring means. In addition earth is shown in FIG. 4 in heavy line. Furthermore the network includes three two-pole switches 6, 7, 8. The lead resistance $L_4$ is bridged by the paid of resistors $R_6'$ and $R_7'$, which have high resistance as compared with the leads.

If $U_E$ is connected with the network by closing switch 6, the voltage drop $U_1$ across the resistor R is tapped off, and due to the small current flow, is not effected by the lead resistances $L_2$ and $L_3$. These lead resistances therefore do not enter into the measurement. If $U_0$ is connected to the network by closing of the switch 8, again the lead resistances have no effect on the quotient measuring means input since merely the voltage drop across $R_2$ is tapped off; $R_2$ is, however, in proximity of the quotient measuring means.

If $U_R$ is connected to the network by closing the switch 7, the lead resistance $L_4$ has no effect on the denominator input to the quotient measuring device because earth is connected between the pair of resistors $R_6'$ and $R_7'$ of high resistance which are incorporated in the network.

It is preferable that $R_6'/R_7' = R_6/R_7$. If the network will carry not direct but alternating current, instead of the resistor R or the thermocouple 3 respectively an inductor or capacitor respectively can be provided. If $U_1$ is an alternating current signal, resistors $R_1$, $R_2$, $R_3$, $R_6$, $R_7$, $R_6'$ and $R_7'$ can be replaced with a combination of inductors and capacitors to achieve a desired impedance.

I claim:

1. Apparatus for converting a measuring voltage into a second voltage which is not proportional to the measuring voltage comprising a first linear circuit element across which there is a drop in said measuring voltage, a network of linear circuit elements connected to said first linear circuit element and to a fixed reference point, a quotient measuring means having a numerator input and a denominator input and also having a zero input variable with respect to said fixed reference point and serving as a variable reference point for the numerator and denominator input voltages, so that from the measuring voltage, two auxiliary voltages are formed of which the one is between the numerator input and the zero input and the other is between the denominator input and the zero input.

2. Apparatus according to claim 1, wherein said linear circuit elements comprise resistors.

3. Apparatus according to claim 2, wherein there is provided a first resistor across which there is a drop in the measuring voltage, and said network comprises second and third resistors in series with said first resistor, fourth and fifth resistors together in series and in parallel with said first and second resistors, sixth and seventh resistors together in series and in parallel with said first, second and third resistors, and wherein the said numerator input, the said zero input and the said denominator input of the said quotient measuring means are respectively connected to the network between said forth and fifth resistors, between said first and second resistors, and between said sixth and seventh resistors, and wherein said first resistor has a resistance of finite value greater than zero.

4. An apparatus according to claim 1, wherein at least one non-linear circuit element, is replaced by a non-linear circuit element.

5. An apparatus according to claim 1 wherein one of the linear circuit elements is replaced by a circuit element whose impedance varies as a function of an external factor.

6. An apparatus according to claim 1, wherein in the case where the measuring voltage source is remote from the network such that the resistance of leads therebetween assumes significant proportions, that lead resistance through which current flows when a measurement is being made has, in parallel, a resistor of high resistance compared with that lead resistance, which resistor of high resistance forms part of the network, and is arranged to be selectively connected to said fixed reference point.

7. An apparatus according to claim 6, wherein a switch is provided operative to isolate each of the three inputs of the quotient measuring means, each such switch being coupled with a further switch actuable in parallel with its associated input switch, and each further switch having one pole connected to said fixed reference point.

8. An apparatus according to claim 7, wherein the resistor of high resistance is constituted as two resistors in series connected to said fixed reference point via a said further switch connected between the two resistors of high resistance.

9. An apparatus according to claim 8, wherein the two resistors constituting said resistor of high resistance are proportional to two resistors of the network between which the denominator input of the quotient measuring means is connected to the network.

10. Apparatus for converting a measuring voltage into values which are not proportional thereto but are proportional to a non-electrical quantity affecting the measuring voltage, comprising means having non-linear characteristics for generating said measuring voltage in dependence upon the said quantity, a quotient measuring means, said quotient measuring means comprising a numerator input and a denominator input and also a zero input variable with respect to a fixed reference point for the numerator and denominator input voltages so that from the measuring voltage, two auxiliary voltages are formed of which the one is between the numerator input and the zero input and the other is between the denominator input and the zero input.

* * * * *

UNITED STATES PATENT OFFICE
CERTIFICATE OF CORRECTION

Patent No. 3,818,207          Dated June 18, 1974

Inventor(s) Gero Zschimmer

It is certified that error appears in the above-identified patent and that said Letters Patent are hereby corrected as shown below:

Patent Front Page [30], "2214430" should be --P 22 14 430.5--.
Column 2, line 68, "$V_E$" should be --$U_E$--.
Column 3, line 18, comma (,) omitted after "$\pm b$";
Column 3, line 18, "sourece" should be --source--.
Column 4, line 11, "effected" should be --affected.

Signed and sealed this 29th day of October 1974.

(SEAL)
Attest:

McCOY M. GIBSON JR.          C. MARSHALL DANN
Attesting Officer          Commissioner of Patents